United States Patent
Minami et al.

(10) Patent No.: US 12,438,146 B2
(45) Date of Patent: Oct. 7, 2025

(54) ELECTRODE MATERIAL FOR LITHIUM-ION BATTERY AND Si ALLOY COMPOSITE POWDER

(71) Applicant: DAIDO STEEL CO., LTD., Nagoya (JP)

(72) Inventors: Kazuki Minami, Nagoya (JP); Yuta Kimura, Nagoya (JP)

(73) Assignee: Daido Steel Co., Ltd., Nagoya (JP)

(*) Notice: Subject to any disclaimer, the term of this patent is extended or adjusted under 35 U.S.C. 154(b) by 0 days.

(21) Appl. No.: 18/693,463

(22) PCT Filed: Sep. 26, 2022

(86) PCT No.: PCT/JP2022/035797
§ 371 (c)(1),
(2) Date: Mar. 19, 2024

(87) PCT Pub. No.: WO2023/054289
PCT Pub. Date: Apr. 6, 2023

(65) Prior Publication Data
US 2024/0396016 A1    Nov. 28, 2024

(30) Foreign Application Priority Data
Sep. 30, 2021 (JP) .................... 2021-161674

(51) Int. Cl.
*H01B 1/04* (2006.01)
*C01B 33/06* (2006.01)
(Continued)

(52) U.S. Cl.
CPC ............ *H01M 4/364* (2013.01); *C01B 33/06* (2013.01); *H01B 1/04* (2013.01); *H01M 4/386* (2013.01);
(Continued)

(58) Field of Classification Search
CPC .. H01B 1/00; H01B 1/04; H01B 1/06; H01M 4/36; H01M 4/38; H01M 4/587; C01B 33/02; C01B 33/06
See application file for complete search history.

(56) References Cited

U.S. PATENT DOCUMENTS 7,378,041 B2   5/2008  Asao et al.
9,406,933 B2 * 8/2016  Jeong ................. C22C 1/03
(Continued)

FOREIGN PATENT DOCUMENTS

JP    2005-209496 A   8/2005
JP    2013-084549 A   5/2013
(Continued)

OTHER PUBLICATIONS

Chae et al "Micron-sized Fe—Cu—Si ternary composite anodes for high energy Li-ion batteries", Energy Environ. Sci., Sep. 2016, 1251.*
(Continued)

*Primary Examiner* — Mark Kopec
(74) *Attorney, Agent, or Firm* — McGinn I.P.Law Group, PLLC

(57) ABSTRACT

The present invention relates to an electrode material for lithium ion battery, containing: a graphite powder; and a Si alloy composite powder, in which the Si alloy composite powder has an average particle diameter of 5 μm or less and contains Si particles, Si—X compound particles (X=Fe, Ni, Cr, Co, Mn, Zr, or Ti), and at least one of Sn—Y compound particles and Al—Y compound particles (Y=Cu, Fe, Ni, Cr, Co, Mn, Zr, or Ti), a proportion of the Si particles in the Si alloy composite powder is 30 mass % to 95 mass %, and a coverage of the Si alloy composite powder on a surface of graphite particles is 5% or more.

9 Claims, 1 Drawing Sheet

(51) Int. Cl.
  *H01M 4/36*  (2006.01)
  *H01M 4/38*  (2006.01)
  *H01M 4/587* (2010.01)
(52) U.S. Cl.
  CPC ......... *H01M 4/587* (2013.01); *C01P 2004/61* (2013.01); *C01P 2004/62* (2013.01); *C01P 2004/64* (2013.01); *C01P 2006/20* (2013.01); *C01P 2006/40* (2013.01)

(56) References Cited

U.S. PATENT DOCUMENTS

| | | | | |
|---|---|---|---|---|
| 9,508,990 | B2* | 11/2016 | Hirono | C22C 28/00 |
| 11,862,787 | B2* | 1/2024 | Kimura | H01M 4/386 |
| 2005/0042128 | A1* | 2/2005 | Matsubara | C22C 29/18 |
| | | | | 419/66 |
| 2013/0084498 | A1* | 4/2013 | Kimura | H01M 4/622 |
| | | | | 429/217 |
| 2018/0261837 | A1 | 9/2018 | Yoo et al. | |
| 2018/0366725 | A1 | 12/2018 | Chiba et al. | |
| 2020/0251723 | A1* | 8/2020 | Kimura | H01M 4/364 |
| 2020/0287204 | A1* | 9/2020 | Kawaura | H01G 11/30 |

FOREIGN PATENT DOCUMENTS

| | | |
|---|---|---|
| JP | 2017-224499 A | 12/2017 |
| JP | 2020-126835 A | 8/2020 |
| TW | 201316596 A1 | 4/2013 |
| WO | WO 2017/082369 A1 | 5/2017 |

OTHER PUBLICATIONS

English language translation of form PCT/ISA/237 dated Dec. 13, 2022.*

English language translation of form PCT/ISA/210 dated Dec. 13, 2022.*

International Search Report (ISR) (PCT Form PCT/ISA/210), in PCT/JP2022/035797, dated Dec. 13, 2022.

Written Opinion of the International Searching Authority (WOISA) (PCT Form PCT/ISA/237), in PCT/JP2022/035797, dated Dec. 13, 2022.

Taiwanese Office Action 111137143 dated Jun. 6, 2023 with English translation.

Extended European Search Report dated Jun. 20, 2025 in European Patent Application No. 22876156.5.

* cited by examiner

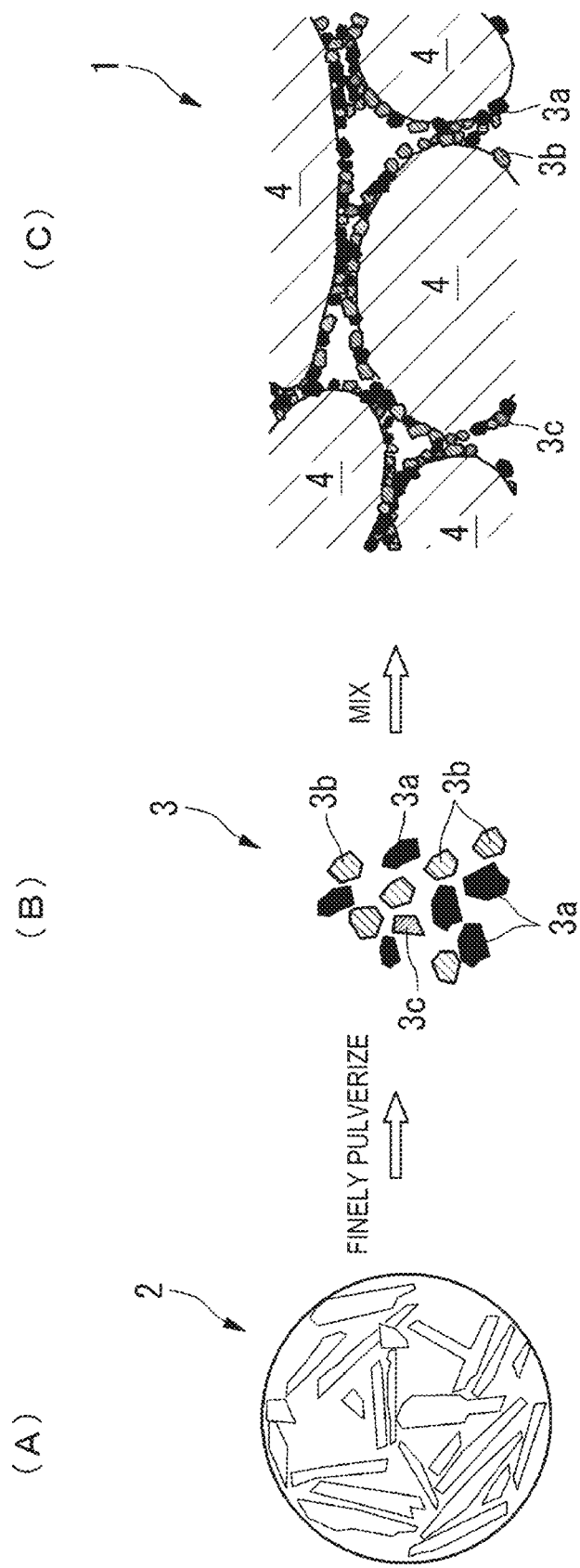

ELECTRODE MATERIAL FOR LITHIUM-ION BATTERY AND Si ALLOY COMPOSITE POWDER

TECHNICAL FIELD

The present invention relates to an electrode material for lithium ion battery and a Si alloy composite powder.

BACKGROUND ART

A lithium ion battery has an advantage of being able to miniaturize with a high capacity and a high voltage, and has been widely used as a power supply for mobile phones and laptops. In recent years, it has attracted much expectations as a power supply for power applications such as electric vehicles and hybrid vehicles, and the development thereof has been actively promoted.

In the lithium ion battery, lithium ions (hereinafter referred to as Li ions) move between a positive electrode and a negative electrode for charging and discharging. On a negative electrode side, Li ions are occluded in a negative electrode active material during charging, and Li ions are released from the negative electrode active material during discharging.

In the related art, lithium cobaltate ($LiCoO_2$) is generally used as an active material on a positive electrode side, and graphite is widely used as the negative electrode active material. However, graphite as the negative electrode active material has a theoretical capacity of only 372 mAh/g, and an increased capacity has been desired.

CITATION LIST

Patent Literature

Patent Literature 1: JP2017-224499A

SUMMARY OF INVENTION

Technical Problem

As an alternative to a carbon-based electrode material, a metal material such as Si, which is expected to have a high capacity, are being considered, and an electrode in which a Si-based material powder is mixed with a graphite powder, which is an electrode material in the related art, is being studied. Si has a theoretical capacity of 4198 mAh/g. However, since Si causes occlusion of Li ions by an alloying reaction with Li, Si has large volume expansion and contraction along with occlusion and release of the Li ions. Therefore, due to Si particles being cracking or peeled off from a current collector, cycle characteristics, which are capacity maintenance characteristics during repeated charging and discharging, deteriorate.

In response to the above, it has been proposed to alloy Si in an electrode material containing Si. For example, in the above Patent Literature 1, a Si phase and a Si compound phase are provided in Si-based alloy particles. The Si compound phase is effective in preventing expansion of the Si phase and improving the cycle characteristics.

However, the Si compound phase itself that restrains the Si phase may not be able to withstand an expansion stress of the Si phase and collapse, and there is still room for improvement in improving battery characteristics in consideration of an initial discharge capacity and the cycle characteristics in the electrode material containing Si.

The present invention has been made in view of the above circumstances, and an object thereof is to provide an electrode material for lithium ion battery and a Si alloy composite powder that can improve battery characteristics in consideration of an initial discharge capacity and cycle characteristics.

Solution to Problem

The present invention relates to an electrode material for lithium ion battery, containing:
a graphite powder; and
a Si alloy composite powder, in which
the Si alloy composite powder has an average particle diameter of 5 μm or less and contains Si particles, Si—X compound particles, and at least one of Sn—Y compound particles and Al—Y compound particles,
an element X constituting the Si—X compound particles is at least one element selected from the group consisting of Fe, Ni, Cr, Co, Mn, Zr, and Ti,
an element Y constituting the Sn—Y compound particles and the Al—Y compound particles is at least one element selected from the group consisting of Cu, Fe, Ni, Cr, Co, Mn, Zr, and Ti,
a proportion of the Si particles in the Si alloy composite powder is 30 mass % to 95 mass %, and
a coverage of the Si alloy composite powder on a surface of graphite particles is 5% or more.

As described above, in the electrode material for lithium ion battery according to the present invention, the Si alloy composite powder constituting the electrode material is refined to an average particle diameter of 5 μm or less, and contains Si particles, Si—X compound particles, and at least one of Sn—Y particles and Al—Y compound particles.

In the case where the Si alloy composite powder contains Si particles, Si—X compound particles, and at least one of Sn—Y compound particles and Al—Y compound particles, a space that allows expansion of Si is easily formed around the Si particles, and as a result, the Si particles can expand independently without being restrained by other compound particles when occluding Li ions. As a result, collapse of the Si particles during expansion is prevented. In addition, in the case where the Si particles is refined, the amount of expansion is reduced, and the collapse of the Si particles is prevented more effectively.

Further, the space around the Si particles serves as a buffer region against the expansion of the Si, and collapse of the Si—X compound particles, which serve as a skeleton in an electrode, is also prevented.

In addition, in the electrode material according to the present invention, the coverage of the Si alloy composite powder with respect to the surface of the graphite particles is 5% or more. Accordingly, it is possible to avoid local stress concentration caused by the expansion of Si and improve the battery characteristics in consideration of the initial discharge capacity and the cycle characteristics.

In consideration of the balance between the initial discharge capacity and the cycle characteristics, a proportion of the graphite powder in a mixed powder of the graphite powder and the Si alloy composite powder is preferably 97 mass % to 20 mass %.

The element X is preferably at least one element selected from the group consisting of Fe, Ni, Cr, and Zr. This is particularly effective in the case where it is desired to improve the cycle characteristics.

The mass ratio represented by {Si—X compound/(total of Sn—Y compound and Al—Y compound)} is preferably 1 to 39. In the case where the above mass ratio is 39 or less, a high initial discharge capacity is maintained, and in the case where the above mass ratio is 1 or more, high cycle characteristics are maintained.

The Y element is preferably a Cu element. This is effective because it has excellent conductivity and can prevent a decrease in cycle characteristics.

From the viewpoint of preventing the expansion of Si, the average particle diameter of the Si alloy composite powder is preferably 1 μm or less, and more preferably 0.7 μm or less.

Another aspect of the present invention relates to a Si alloy composite powder useful for use in the above electrode material. Specifically, it is a Si alloy composite powder,
having an average particle diameter of 5 μm or less and
containing: Si particles: Si—X compound particles; and at least one of Sn—Y compound particles and Al—Y compound particles, in which
an element X constituting the Si—X compound particles is at least one element selected from the group consisting of Fe, Ni, Cr, Co, Mn, Zr, and Ti,
an element Y constituting the Sn—Y compound particles and the Al—Y compound particles is at least one element selected from the group consisting of Cu, Fe, Ni, Cr, Co, Mn, Zr, and Ti, and
a proportion of the Si particles in the Si alloy composite powder is 30 mass % to 95 mass %.

The Si alloy composite powder is preferably used for an electrode material together with a graphite powder.

BRIEF DESCRIPTION OF DRAWINGS

The FIGURE provides schematic diagrams illustrating a configuration of an electrode material according to an embodiment of the present invention, in which (A) in the FIGURE illustrates Si alloy particles before fine pulverization, (B) in the FIGURE illustrates a Si alloy composite powder after the fine pulverization, and (C) in the FIGURE illustrates a state where the Si alloy composite powder is mixed with a graphite powder.

DESCRIPTION OF EMBODIMENTS

Next, an electrode material for lithium ion battery according to an embodiment of the present invention and a lithium ion battery using the present electrode material as a negative electrode (hereinafter may be simply referred to as a battery) are specifically described. Note that, "to" is used to mean that numerical values written before and after it are included as a lower limit value and an upper limit value.

1. Present Electrode Material

The FIGURE provides diagrams illustrating a configuration of the present electrode material. In the same FIGURE, 1 denotes an electrode material, 2 denotes Si alloy particles before fine pulverization, 3 denotes a Si alloy composite powder after the fine pulverization, 3a denotes Si particles, 3b denotes Si—X compound particles, 3c denotes Sn—Y compound particles or Al—Y compound particles, and 4 denotes graphite particles. As illustrated in the FIGURE, the present electrode material is obtained by mixing the graphite powder and the Si alloy composite powder, and specifically, is obtained by covering a part of a surface of the graphite particles 4 with the fine Si particles 3a, the Si—X compound particles 3b, the Sn—Y compound particles or the Al—Y compound particles 3c constituting the Si alloy composite powder 3.

The graphite powder has been used as a negative electrode material for a lithium ion battery in the related art. Since graphite hardly expands or contracts due to intercalation and desorption of Li ions, characteristics thereof do not deteriorate even after repeated charging and discharging. However, as described above, graphite has a low theoretical capacity and cannot be expected to have an increased battery capacity. Therefore, in this example, the capacity as a negative electrode material is increased by mixing graphite with the Si alloy composite powder to be described below.

Here, in this example, a proportion of the graphite powder in the mixed powder of the graphite powder and the Si alloy composite powder is preferably 97 mass % to 20 mass %. This is to balance the capacity (initial discharge capacity) and the cycle characteristics.

Note that, a particle diameter (average particle diameter) of the graphite powder used in this example can be exemplified as 0.5 μm to 50 μm.

On the other hand, the Si alloy composite powder is an alloy powder including each phase of Si alone, a Si—X compound, and at least one of a Sn—Y compound and an Al—Y compound. Here, the element X constituting the Si—X compound is at least one element selected from the group consisting of Fe, Ni, Cr, Co, Mn, Zr, and Ti. In addition, the element Y constituting the Sn—Y compound and the Al—Y compound is at least one element selected from the group consisting of Cu, Fe, Ni, Cr, Co, Mn, Zr, and Ti.

That is, the Si alloy composite powder is made of these main constituent elements, that is, Si, at least one of Sn, and Al, the element X, and the element Y, and does not contain any elements other than these main constituent elements except for inevitable impurities. Examples of the inevitable impurities include nitrogen (N), sulfur(S), and phosphorus (P). The respective upper limits are N≤0.10 mass %, S≤0.10 mass %, P≤0.10 mass %, and O≤15 mass %.

The Si alloy composite powder has an average particle diameter of 5 μm or less, and contains Si particles, Si—X compound particles, and at least one of Sn—Y compound particles and Al—Y compound particles. The reason why the Si alloy composite powder is specified to have an average particle diameter of 5 μm or less is mainly to reduce an absolute amount of expansion of Si alone (Si particles) that occludes Li. The average particle diameter is preferably 3 μm or less, more preferably 2 μm or less, still more preferably 1 μm or less, and particularly preferably 0.7 μm or less. The lower limit of the average particle diameter of the Si alloy composite powder is not particularly limited, and is generally 0.05 μm or more. The average particle diameter of Si alloy composite particles is preferably smaller than the average particle diameter of the graphite particles.

Here, the "particle diameter" refers to the diameter when the area of particles constituting the Si alloy composite powder obtained by analyzing a cross-sectional scanning electron microscope (SEM) image is converted into a circle having the same area, that is, the diameter of an equivalent circle. In addition, the "average particle diameter" refers to the average value analyzed for 100 particles from a cross-sectional SEM image (magnification: 5000 times) of the Si alloy composite powder.

The Si particles are particles consisting only of a Si phase, or particles in which 95 mass % or more of the particles consist of a Si phase.

The proportion of the Si particles in the entire Si alloy composite powder is 30 mass % to 95 mass %, more preferably 45 mass % to 90 mass %, still more preferably 50 mass % to 80 mass %, and particularly preferably 60 mass % to 70 mass %. Here, the proportion of the Si particles is 30 mass % or more, more preferably 45 mass % or more, still more preferably 50 mass % or more, and particularly preferably 60 mass % or more, from the viewpoint of preventing a decrease in initial discharge capacity. In addition, the proportion of the Si particles is 95 mass % or less, more preferably 90 mass % or less, still more preferably 80 mass % or less, and particularly preferably 70 mass % or less, from the viewpoint of preventing a relative decrease in Si—X compound particles and a decrease in cycle characteristics.

The Si—X compound particles are particles consisting only of a Si—X compound, or particles in which 95 mass % or more of the particles consist of a Si—X compound.

The Si—X compound has a poor Li occlusion property and has very little expansion due to a reaction with Li ions. Therefore, the Si—X compound particles play the role of a skeleton that maintains a structure of the electrode material. In addition, the Si—X compound has high conductivity and is effective in ensuring the conductivity between the Si alloy composite powder and the graphite powder.

In this example, the Si—X compound may have different characteristics such as a Li occlusion property and conductivity depending on which element is selected as the element X. Among the above elements X, the element X is preferably at least one element selected from the group consisting of Fe, Ni, Cr, and Zr, since Fe, Ni, Cr, and Zr are particularly excellent in low expansion property and high conductivity expected of the Si—X compound.

Note that the Si—X compound particles can include only one type of compound, and can also include two types of compounds, such as a Si—Fe compound and a Si—Ni compound.

The Sn—Y compound particles are particles consisting only of a Sn—Y compound, or particles in which 95 mass % or more of the particles consist of a Sn—Y compound.

The Sn—Y compound has a theoretical capacity lower than that of Si and higher than that of the Si—X compound. For example, a Si—Zr compound (Si—X compound) has a theoretical capacity of 100 mAh/g, while the Sn—Y compound has a theoretical capacity of 150 mAh/g to 600 mAh/g. Therefore, in this example, a diffusion path for Li ions is easily ensured through the Sn—Y compound particles. On the other hand, since a degree of expansion of the Sn—Y compound due to the reaction with Li ions is smaller than that of Si or Sn alone, which has high reactivity with Li ions, an adverse influence on the cycle characteristics due to formation of the Sn—Y compound can be reduced. In addition, the Sn—Y compound has the effect of increasing the conductivity, similar to the Si—X compound.

Note that, such effects of the Sn—Y compound can also be obtained by using an Al—Y compound. Therefore, in the Si alloy composite powder in this example, it is also possible to use Al—Y compound particles instead of all or a part of the Sn—Y compound particles.

Here, a Sn—Cu compound or an Al—Cu compound in which Cu is selected as the element Y is preferred because it has excellent conductivity and more hardly causes a decrease in cycle characteristics than other Sn compounds or Al compounds.

As described above, the Si—X compound and the at least one of the Sn—Y compound and the Al—Y compound play different roles, and the battery characteristics obtained also change depending on the proportions of these compounds. The Sn—Y compound or the Al—Y compound expands more than the Si—X compound due to the reaction with Li ions, although the degree of expansion is not so large. Therefore, the mass ratio represented by {Si—X compound/ (Sn—Y compound or Al—Y compound)} is preferably 0.5 to 45, more preferably 1 to 39, still more preferably 1.5 to 39, and particularly preferably 2.5 to 10. Here, the above mass ratio is preferably 0.5 or more, more preferably 1 or more, still more preferably 1.5 or more, and particularly preferably 2.5 or more, from the viewpoint of preventing a decrease in cycle characteristics. On the other hand, the above mass ratio is preferably 45 or less, more preferably 39 or less, and still more preferably 10 or less, from the viewpoint of obtaining a high initial discharge capacity.

The content of each main element suitable for obtaining the above composition phase in the entire Si alloy composite powder is as follows. Note that in the following description, "%" means "mass %" unless otherwise specified.

The content of Si is preferably 50% to 95%, more preferably 60% to 80%, and still more preferably 71% to 80%. Here, the content of Si is preferably 50% or more, more preferably 60% or more, and still more preferably 71% or more, from the viewpoint of obtaining a high initial discharge capacity. In addition, the content of Si is preferably 95% or less, and more preferably 80% or less, from the viewpoint of obtaining good cycle characteristics.

The content of the element X is preferably 1% to 30%, and more preferably 5% to 20%. Here, the content of the element X is preferably 1% or more, and more preferably 5% or more, from the viewpoint of obtaining good cycle characteristics. In addition, the content of the element X is preferably 30% or less, and more preferably 20% or less, from the viewpoint of obtaining a high initial discharge capacity.

The content of each of Sn and Al is preferably 0.1% to 20%, more preferably 1% to 10%, and still more preferably 2% to 9%. Here, the content of each of Sn and Al is preferably 0.1% or more, more preferably 1% or more, and still more preferably 2% or more, from the viewpoint of further obtaining the effect as a Li diffusion path. In addition, the content of each of Sn and Al is preferably 20% or less, more preferably 10% or less, and still more preferably 9% or less, from the viewpoint of preventing a decrease in cycle characteristics due to expansion of the Sn—Y compound or the Al—Y compound.

In addition, in the case where Sn and Al are contained together, the total content of Sn and Al is preferably within the above range. Specifically, the total content is preferably 0.1% to 20%, more preferably 1% to 10%, and still more preferably 2% to 9%.

The content of the element Y is preferably 0.1% to 15%, and more preferably 1% to 10%. Here, the content of the element Y is preferably 0.1% or more, and more preferably 1% or more, from the viewpoint of further obtaining the effect as a Li diffusion path. In addition, the content of the element Y is preferably 15% or less, and more preferably 10% or less, from the viewpoint of preventing a decrease in cycle characteristics due to expansion of the Sn—Y compound or the Al—Y compound.

In this example, the Si alloy composite powder configured as described above is mixed with a graphite powder, and the proportion (coverage) of the Si alloy composite powder covering the surface of the graphite particles is 5% or more. Here, the coverage is a value (percentage) obtained by dividing the length of a contact portion between the particles constituting the Si alloy composite powder and the graphite particles by the total circumference length of the graphite particles in cross-sectional observation using an electron microscope. This coverage also serves as an index indicating a degree of dispersion of the Si alloy composite powder in the electrode material. In the case where the coverage is low and the Si alloy composite powder is locally unevenly distributed, the expansion in the unevenly distributed portion is larger than in other areas, increasing a concern of peeling-off or collapse in the unevenly distributed portion.

According to the results evaluated by the inventors of the present invention, in the case where the Si alloy composite powder is dispersed and mixed such that the coverage is 5% or more, it is possible to increase the initial discharge capacity and prevent a decrease in cycle characteristics. The preferred coverage is 7% or more, and the more preferred coverage is 10% or more.

Next, a method for producing the present negative electrode material containing the graphite powder and the Si alloy composite powder is described.

First, an example of a method for producing the Si alloy composite powder is described.

Respective raw materials are weighed out such that a predetermined chemical composition is obtained, and a molten alloy obtained by melting the weighed raw materials by using a melting device such as an arc furnace, a high frequency induction furnace, or a heating furnace is quenched by using an atomization method, to thereby obtain the Si alloy as a quenched alloy.

In the atomization method, a gas such as $N_2$, Ar, or He is sprayed at a high pressure, for example, 1 MPa to 10 MPa, against the molten alloy that is discharged into an atomization chamber and that continuously (rod-like) flows downward, whereby the molten alloy is pulverized and cooled. The cooled molten alloy approaches a spherical shape while free-falling in the atomization chamber in a semi-molten state, and a Si alloy in the form of a powder (see, for example, (A) in the FIGURE is obtained. In addition, high-pressure water may be sprayed instead of the gas from the viewpoint of improving a cooling effect.

In some cases, it is also possible to obtain a foiled Si alloy by using a roll quenching method instead of the atomization method.

Next, the obtained Si alloy is finely pulverized by using an appropriate pulverizing means such as a ball mill, a bead mill, a disk mill, a coffee mill, or a mortar pulverizer to have an average particle diameter of 5 μm or less, to obtain a Si alloy composite powder containing Si particles, Si—X compound particles, and at least one of Sn—Y compound particles and Al—Y compound particles, each of which is present independently.

Next, the obtained Si alloy composite powder and a graphite powder are prepared in accordance with a predetermined blending ratio, and mixed by using a ball mill, a mixer, or the like to prepare the electrode material in this example. At this time, the coverage of the Si alloy composite powder with respect to the graphite powder can be adjusted by appropriately changing conditions such as the mixing time.

2. Present Battery

The present battery is formed by using a negative electrode containing the present electrode material.

The negative electrode includes a conductive substrate and a conductive film laminated on a surface of the conductive substrate. The conductive film contains at least the present electrode material described above in a binder.

The conductive substrate functions as a current collector. Examples of a material thereof include Cu, a Cu alloy, Ni, a Ni alloy, Fe, and an Fe-based alloy. Preferably, it is Cu or a Cu alloy. Examples of a specific form of the conductive substrate include a foil form and a plate form. A foil form is preferred from the viewpoint of reducing the volume of the battery and improving the degree of freedom in form.

As a material of the binder, for example, a polyvinylidene fluoride (PVdF) resin, a fluorine resin such as polytetrafluoroethylene, a polyvinyl alcohol resin, a polyimide resin, a polyamide resin, a polyamideimide resin, a styrene-butadiene rubber (SBR), or polyacrylic acid can be suitably used. These may be used alone or in combination of two or more thereof. Among these, a polyimide resin is particularly preferred because it has high mechanical strength, can withstand volume expansion of the active material, and effectively prevents the conductive film from peeling off from the current collector due to breakage of the binder.

The conductive film may also contain a conductive aid, if necessary. In the case where a conductive aid is contained, it is easier to ensure a conductive path for electrons. In addition, the conductive film may contain an aggregate, if necessary. In the case where an aggregate is contained, expansion and contraction of the negative electrode during charging and discharging can be easily prevented, and collapse of the negative electrode can be prevented, so that the cycle characteristics can be further improved.

The present negative electrode can be produced by, for example, adding necessary amounts of the present negative electrode material, and, if necessary, a conductive aid and an aggregate to a binder dissolved in an appropriate solvent to form a paste, applying the paste to a surface of the conductive substrate, followed by drying, and optionally subjecting it to densification, a heat treatment, or the like.

In the case of forming a lithium ion battery using the present negative electrode, there are no particular limitations on a positive electrode, an electrolyte, a separator, and the like, which are basic components of the battery other than the present negative electrode.

Specific examples of the positive electrode include those in which a layer containing a positive electrode active material such as $LiCoO_2$, $LiNiO_2$, $LiFePO_4$, and $LiMnO_2$ is formed on a surface of a current collector such as an aluminum foil.

Specific examples of the electrolyte include an electrolytic solution in which a lithium salt is dissolved in a non-aqueous solvent. In addition, it is also possible to use a polymer in which a lithium salt is dissolved, a polymer solid electrolyte in which a polymer is impregnated with the above-described electrolytic solution, and the like.

Specific examples of the non-aqueous solvent include ethylene carbonate, propylene carbonate, butylene carbonate, dimethyl carbonate, diethyl carbonate, and methyl ethyl carbonate. These may be used alone or in combination of two or more thereof.

Specific examples of the lithium salt include $LiPF_6$, $LiBF_4$, $LiClO_4$, $LiCF_3SO_3$, and $LiAsF_6$. These may be used alone or in combination of two or more thereof.

Other battery components include a separator, a can (battery case), and a gasket. As for these, as long as they are commonly used in a lithium ion battery, any of them can be appropriately combined to form a battery.

Note that the shape of the battery is not particularly limited, and may be any shape such as a cylindrical shape, a rectangular shape, or a coin shape, and can be appropriately selected according to a specific application.

EXAMPLES

Hereinafter, the present invention is described more specifically using Examples. Note that "%" in the alloy composition is "mass %" unless otherwise specified.

1. Preparation of Electrode Material for Negative Electrode

Table 1 below shows alloy compositions of Si alloy composite powders, 33 types thereof for Examples and 6 types thereof for Comparative Examples. Respective alloy compositions shown in Table 1 are defined so as to obtain target compositions shown in Tables 2 and 3 below. Note that, in Table 1, the total of all chemical components may be 100.1%, but this is due to rounding to the same significant FIGURE.

First, each raw material shown in Table 1 was weighed out. The weighed raw materials were heated and melted by using a high frequency induction furnace to obtain molten alloys. Si alloys in the form of a powder were prepared from the molten alloys by a gas atomization method. Note that, an argon atmosphere was used as an atmosphere during the preparation of the molten alloys and the gas atomization. In addition, during the gas atomization, high-pressure (4 MPa) argon gas was sprayed onto the molten alloys falling like a rod in the atomization chamber.

Each of the obtained Si alloys was mechanically finely pulverized by using a wet bead mill to obtain a Si alloy composite powder for use in an electrode material for a negative electrode.

The obtained Si alloy composite powder and a graphite powder were prepared according to the predetermined proportions shown in Tables 2 and 3 below, and these were mixed by using a mixer to prepare an electrode material for a negative electrode. The graphite powder used here has an average particle diameter of 20 μm.

TABLE 1

| | | Chemical composition (mass %) | | | | | | | | | | |
|---|---|---|---|---|---|---|---|---|---|---|---|---|
| | | Si | Sn | Cu | Fe | Ni | Cr | Co | Mn | Ti | Zr | Al |
| Ex. | 1 | 77.7 | 3.0 | 2.0 | 17.3 | — | — | — | — | — | — | — |
| | 2 | 87.6 | 3.0 | 2.0 | 7.4 | — | — | — | — | — | — | — |
| | 3 | 92.5 | 3.0 | 2.0 | 2.5 | | — | — | | — | — | — |
| | 4 | 75.2 | 6.0 | 4.0 | 14.9 | — | — | — | — | — | — | — |
| | 5 | 75.3 | 6.0 | 4.0 | — | 14.7 | — | — | — | — | — | — |
| | 6 | 75.6 | 6.0 | 4.0 | — | — | 14.4 | — | — | — | — | — |
| | 7 | 74.6 | 6.0 | 4.0 | — | — | — | 15.4 | — | — | — | — |
| | 8 | 75.2 | 6.0 | 4.0 | — | — | — | — | 14.8 | — | — | — |
| | 9 | 60.3 | 6.0 | 4.0 | 29.7 | — | — | — | — | — | — | — |
| | 10 | 60.7 | 6.0 | 4.0 | — | 29.3 | — | — | — | — | — | — |
| | 11 | 61.2 | 6.0 | 4.0 | — | — | 28.8 | — | — | — | — | — |
| | 12 | 73.4 | 6.0 | 4.0 | 7.4 | — | — | — | — | — | 9.2 | — |
| | 13 | 75.7 | 6.0 | 4.0 | 7.4 | — | — | — | — | 6.9 | — | — |
| | 14 | 74.6 | 6.0 | 4.0 | 12.4 | — | — | — | — | — | 3.1 | — |
| | 15 | 75.3 | 6.0 | 4.0 | 12.4 | — | — | — | — | 2.3 | — | — |
| | 16 | 75.2 | 6.7 | — | 14.9 | — | — | — | — | 3.3 | — | — |
| | 17 | 75.2 | 8.0 | — | 14.9 | — | — | 2.0 | — | — | — | — |
| | 18 | 75.2 | 8.1 | — | 16.8 | — | — | — | — | — | — | — |
| | 19 | 75.2 | 7.3 | — | 14.9 | 2.7 | — | — | — | — | — | — |
| | 20 | 75.2 | — | 7.0 | 14.9 | — | — | — | — | — | — | 3.0 |
| Ex. | 21 | 75.2 | — | — | 18.9 | — | — | — | — | — | — | 6.0 |
| | 22 | 75.2 | — | — | 14.9 | 4.2 | — | — | — | — | — | 5.8 |
| | 23 | 75.2 | — | — | 14.9 | — | — | — | — | — | 5.3 | 4.7 |
| | 24 | 75.2 | — | — | 14.9 | — | — | — | — | 3.7 | — | 6.3 |
| | 25 | 77.7 | 3.0 | 2.0 | 17.3 | — | — | — | — | — | — | — |
| | 26 | 77.7 | 3.0 | 2.0 | 17.3 | — | — | — | — | — | — | — |
| | 27 | 77.7 | 3.0 | 2.0 | 17.3 | — | — | — | — | — | — | — |
| | 28 | 77.7 | 3.0 | 2.0 | 17.3 | — | — | — | — | — | — | — |
| | 29 | 77.7 | 3.0 | 2.0 | 17.3 | — | — | — | — | — | — | — |
| | 30 | 77.7 | 3.0 | 2.0 | 17.3 | — | — | — | — | — | — | — |
| | 31 | 77.7 | 3.0 | 2.0 | 17.3 | — | — | — | — | — | — | — |
| | 32 | 77.7 | 3.0 | 2.0 | 17.3 | — | — | — | — | — | — | — |
| | 33 | 77.7 | 3.0 | 2.0 | 17.3 | — | — | — | — | — | — | — |
| Comp. | 1 | 75.2 | 6.0 | 4.0 | 14.9 | — | — | — | — | — | — | — |
| Ex. | 2 | 75.2 | 6.0 | 4.0 | 14.9 | — | — | — | — | — | — | — |
| | 3 | 80.2 | — | — | 19.8 | — | — | — | — | — | — | — |
| | 4 | 60.0 | 24.0 | 16.0 | — | — | — | — | — | — | — | — |
| | 5 | 50.3 | 12.0 | 8.0 | 29.7 | — | — | — | — | — | — | — |
| | 6 | 98.99 | 0.03 | 0.02 | 0.97 | — | — | — | — | — | — | — |

2. Preparation of Coin-Type Battery for Charging and Discharging Test

First, 100 parts by mass of the prepared electrode material as a negative electrode active material, 6 parts by mass of Ketjen black (manufactured by Lion Corporation) as a conductive aid, and 19 parts by mass of a polyimide (thermoplastic resin) binder as a binder were blended and mixed with N-methyl-2-pyrrolidone (NMP) as a solvent to thereby prepare each paste containing each electrode material. Note that, the kneading time during the paste preparation was 1 hour in Examples 27 to 33. The kneading time was 5 minutes in Comparative Example 1. The kneading time was 15 to 30 minutes in other Examples and Comparative Examples.

Each coin-type half cell was prepared as follows. Here, for sake of simple evaluation, an electrode prepared by using an electrode material for a negative electrode was used as a test electrode, and a Li foil was used as a counter electrode. First, each paste was applied to a surface of a stainless steel (SUS) 316L foil (thickness: 20 μm) as a negative electrode current collector by using a doctor blade method so as to be 50 μm, followed by drying to form a negative electrode active material layer. After formation, the negative electrode active material layer was densified by roll pressing. Accordingly, test electrodes made of electrode materials according to Examples and Comparative Examples were prepared.

Next, each of the test electrodes according to Examples and Comparative Examples was punched into a disc shape having a diameter of 11 mm to obtain a test electrode.

Next, a Li foil (thickness: 500 μm) was punched into substantially the same shape as the test electrode to prepare a counter electrode. In addition, a non-aqueous electrolytic solution was prepared by dissolving $LiPF_6$ at a concentration of 1 mol/l in an equivalent mixed solvent of ethylene carbonate (EC) and diethyl carbonate (DEC) in terms of volume proportion.

Next, the test electrode was housed in a positive electrode can, and the counter electrode was housed in a negative electrode can, and a separator made of a polyolefin-based microporous film was disposed between the test electrode and the counter electrode. Note that the test electrode should be a negative electrode in a lithium ion battery, but when a Li foil is used as the counter electrode, the Li foil is the negative electrode and the test electrode is the positive electrode.

Next, the above-described non-aqueous electrolytic solution was injected into both cans, and the negative electrode can and the positive electrode can were crimped and fixed to each other.

3. Evaluation on Electrode Material 3-1. Confirmation of Composition Phase of Electrode Material The finely pulverized Si alloy composite powder was analyzed by XRD (X-ray diffraction) to confirm the presence or absence of Si particles, Si—X compound particles, Sn—Y compound particles, and Al—Y compound particles.

3-2. Calculation of Phase Proportion

A method of calculating a phase proportion (proportion of each phase to the whole) shown in Tables 2 and 3 below is described with reference to Example 1 as an example.

(1) First, the composition phases in the prepared powder are confirmed. In the case of Example 1, as a result of the above described XRD analysis, Si, $Si_2Fe$, and $Sn_5Cu_6$ have been confirmed (see Table 2).

(2) $Si_2Fe$ is 50.1 [Si]—49.9 [Fe] in terms of ratio in mass %. Correspondingly, the amount of Si to be compound is 17.3×50.1/49.9=17.4 (mass %). Therefore, the proportion of the Si—X compound phase ($Si_2Fe$) is a value of the total of the amount of Si to be compound (17.4 mass %) and the amount of Fe (17.3 mass %) in Table 1, and is thus 35% in this example.

(4) The proportion of the Si phase is a value obtained by subtracting the amount of Si to be compound (17.4 mass %) from the total amount of Si (77.7 mass %), and is thus 60% in this example.

Note that, the proportion of the Sn—Y phase (the proportion of the Sn—Y compound phase in the whole) is a value of the total of the amount of Sn and the amount of the element Y (Cu in the case of Example 1) in Table 1, and is thus 5% in this example.

In Tables 2 and 3, SiX/(SnY or AlY) indicates the mass ratio represented by {Si—X compound/(total of Sn—Y compound and Al—Y compound)}.

TABLE 2

|  |  | Target composition phase | Type of SiX | Phase proportion (mass %) | | | |
|---|---|---|---|---|---|---|---|
|  |  |  |  | Si | SiX | SnY | AlY |
| Ex. | 1 | 60[Si]—35[$Si_2Fe$]—5[$Sn_5Cu_6$] | $Si_2Fe$ | 60 | 35 | 5 | 0 |
|  | 2 | 80[Si]—15[$Si_2Fe$]—5[$Sn_5Cu_6$] | $Si_2Fe$ | 80 | 15 | 5 | 0 |
|  | 3 | 90[Si]—5[$Si_2Fe$]—5[$Sn_5Cu_6$] | $Si_2Fe$ | 90 | 5 | 5 | 0 |
|  | 4 | 60[Si]—30[$Si_2Fe$]—10[$Sn_5Cu_6$] | $Si_2Fe$ | 60 | 30 | 10 | 0 |
|  | 5 | 60[Si]—30[$Si_2Ni$]—10[$Sn_5Cu_6$] | $Si_2Ni$ | 60 | 30 | 10 | 0 |
|  | 6 | 60[Si]—30[$Si_2Cr$]—10[$Sn_5Cu_6$] | $Si_2Cr$ | 60 | 30 | 10 | 0 |
|  | 7 | 60[Si]—30[$Si_2Co$]—10[$Sn_5Cu_6$] | $Si_2Co$ | 60 | 30 | 10 | 0 |
|  | 8 | 60[Si]—30[$Si_2Mn$]—10[$Sn_5Cu_6$] | $Si_2Mn$ | 60 | 30 | 10 | 0 |
|  | 9 | 30[Si]—60[$Si_2Fe$]—10[$Sn_5Cu_6$] | $Si_2Fe$ | 30 | 60 | 10 | 0 |
|  | 10 | 30[Si]—60[$Si_2Ni$]—10[$Sn_5Cu_6$] | $Si_2Ni$ | 30 | 60 | 10 | 0 |
|  | 11 | 30[Si]—60[$Si_2Cr$]—10[$Sn_5Cu_6$] | $Si_2Cr$ | 30 | 60 | 10 | 0 |
|  | 12 | 60[Si]—15[$Si_2Fe$]—15[$Si_2Zr$]—5[$Sn_5Cu_6$] | $Si_2Fe$/$Si_2Zr$ | 60 | 30 | 10 | 0 |
|  | 13 | 60[Si]—15[$Si_2Fe$]—15[$Si_2Ti$]—5[$Sn_5Cu_6$] | $Si_2Fe$/$Si_2Ti$ | 60 | 30 | 10 | 0 |
|  | 14 | 60[Si]—25[$Si_2Fe$]—5[$Si_2Zr$]—5[$Sn_5Cu_6$] | $Si_2Fe$/$Si_2Zr$ | 60 | 30 | 10 | 0 |
|  | 15 | 60[Si]—25[$Si_2Fe$]—5[$Si_2Ti$]—5[$Sn_5Cu_6$] | $Si_2Fe$/$Si_2Ti$ | 60 | 30 | 10 | 0 |
|  | 16 | 60[Si]—30[$Si_2Fe$]—10[$Sn_5Ti_6$] | $Si_2Fe$ | 60 | 30 | 10 | 0 |

TABLE 2-continued

| | | Target composition phase | Type of SiX | Si | SiX | SnY | AlY |
|---|---|---|---|---|---|---|---|
| | 17 | 60[Si]—30[Si₂Fe]—10[Sn₂Co] | Si₂Fe | 60 | 30 | 10 | 0 |
| | 18 | 60[Si]—30[Si₂Fe]—10[Sn₂Fe] | Si₂Fe | 60 | 30 | 10 | 0 |
| | 19 | 60[Si]—30[Si₂Fe]—10[Ni₃Sn₄] | Si₂Fe | 60 | 30 | 10 | 0 |
| | 20 | 60[Si]—30[Si₂Fe]—10[AlCu] | Si₂Fe | 60 | 30 | 0 | 10 |

| | | SiX/(SnY or AlY) | Si composite powder average particle diameter (μm) | Graphite coverage (%) | Graphite powder proportion (wt %) | Initial discharge capacity (mAh/g) | Discharge capacity retention rate (%) |
|---|---|---|---|---|---|---|---|
| Ex. | 1 | 7 | 4.2 | 10.8 | 90 | B (475) | B (88) |
| | 2 | 3 | 4.5 | 11.7 | 90 | B (493) | B (84) |
| | 3 | 1 | 4.1 | 10.1 | 90 | B (511) | B (80) |
| | 4 | 3 | 4.2 | 12.5 | 90 | B (487) | B (87) |
| | 5 | 3 | 4.3 | 10.9 | 90 | B (472) | B (85) |
| | 6 | 3 | 4.9 | 13.1 | 90 | B (463) | B (86) |
| | 7 | 3 | 4.7 | 10.4 | 90 | B (480) | B (85) |
| | 8 | 3 | 4.3 | 10.6 | 90 | B (460) | B (86) |
| | 9 | 6 | 4.5 | 11.5 | 90 | B (469) | B (87) |
| | 10 | 6 | 4.6 | 12.1 | 90 | B (468) | B (85) |
| | 11 | 6 | 4.8 | 10.6 | 90 | B (464) | B (87) |
| | 12 | 3 | 4.2 | 12.3 | 90 | B (470) | B (92) |
| | 13 | 3 | 4.4 | 11.3 | 90 | B (465) | B (87) |
| | 14 | 3 | 4.7 | 11.1 | 90 | B (473) | B (90) |
| | 15 | 3 | 4.1 | 10.9 | 90 | B (476) | B (88) |
| | 16 | 3 | 4.1 | 11.4 | 90 | B (472) | B (83) |
| | 17 | 3 | 4.2 | 10.3 | 90 | B (463) | B (81) |
| | 18 | 3 | 4.2 | 10.6 | 90 | B (451) | B (82) |
| | 19 | 3 | 4.1 | 10.7 | 90 | B (469) | B (80) |
| | 20 | 3 | 4.3 | 11.5 | 90 | B (461) | C (78) |

TABLE 3

| | | | | Phase proportion (mass %) | | | |
|---|---|---|---|---|---|---|---|
| | | Target composition phase | Type of SiX | Si | SiX | SnY | AlY |
| Ex. | 21 | 60[Si]—30[Si₂Fe]—10[Al₃Fe] | Si₂Fe | 60 | 30 | 0 | 10 |
| | 22 | 60[Si]—30[Si₂Fe]—10[Al₃Ni] | Si₂Fe | 60 | 30 | 0 | 10 |
| | 23 | 60[Si]—30[Si₂Fe]—10[Al₃Zr] | Si₂Fe | 60 | 30 | 0 | 10 |
| | 24 | 60[Si]—30[Si₂Fe]—10[Al₃Ti] | Si₂Fe | 60 | 30 | 0 | 10 |
| | 25 | 60[Si]—35[Si₂Fe]—5[Sn₅Cu₆] | Si₂Fe | 60 | 35 | 5 | 0 |
| | 26 | 60[Si]—35[Si₂Fe]—5[Sn₅Cu₆] | Si₂Fe | 60 | 35 | 5 | 0 |
| | 27 | 60[Si]—35[Si₂Fe]—5[Sn₅Cu₆] | Si₂Fe | 60 | 35 | 5 | 0 |
| | 28 | 60[Si]—35[Si₂Fe]—5[Sn₅Cu₆] | Si₂Fe | 60 | 35 | 5 | 0 |
| | 29 | 60[Si]—13[Si₂Fe]—27[Sn₅Cu₆] | Si₂Fe | 60 | 35 | 5 | 0 |
| | 30 | 60[Si]—39[Si₂Fe]—1[Sn₅Cu₆] | Si₂Fe | 60 | 35 | 5 | 0 |
| | 31 | 60[Si]—35[Si₂Fe]—5[Sn₅Cu₆] | Si₂Fe | 60 | 35 | 5 | 0 |
| | 32 | 60[Si]—35[Si₂Fe]—5[Sn₅Cu₆] | Si₂Fe | 60 | 35 | 5 | 0 |
| | 33 | 60[Si]—35[Si₂Fe]—5[Sn₅Cu₆] | Si₂Fe | 60 | 35 | 5 | 0 |
| Comp. Ex. | 1 | 60[Si]—30[Si₂Fe]—10[Sn₅Cu₆] | Si₂Fe | 60 | 30 | 10 | 0 |
| | 2 | 60[Si]—30[Si₂Fe]—10[Sn₅Cu₆] | Si₂Fe | 60 | 30 | 10 | 0 |
| | 3 | 60[Si]—40[Si₂Fe] | Si₂Fe | 60 | 40 | 0 | 0 |
| | 4 | 60[Si]—40[Sn₅Cu₆] | — | 60 | — | 40 | 0 |
| | 5 | 20[Si]—60[Si₂Fe]—20[Sn₅Cu₆] | Si₂Fe | 20 | 60 | 20 | 0 |
| | 6 | 98[Si]—1.95[Si₂Fe]—0.05[Sn₅Cu₆] | Si₂Fe | 98 | 1.95 | 0.05 | 0 |

| | | SiX/(SnY or AlY) | Si composite powder average particle diameter (μm) | Graphite coverage (%) | Graphite powder proportion (wt %) | Initial discharge capacity (mAh/g) | Discharge capacity retention rate (%) |
|---|---|---|---|---|---|---|---|
| Ex. | 21 | 3 | 4.5 | 11.2 | 90 | B (451) | C (76) |
| | 22 | 3 | 4.6 | 10.8 | 90 | B (472) | C (75) |
| | 23 | 3 | 4.6 | 10.3 | 90 | B (464) | C (77) |
| | 24 | 3 | 4.2 | 10.9 | 90 | B (470) | C (75) |
| | 25 | 7 | 0.8 | 11.1 | 90 | B (481) | A (95) |
| | 26 | 7 | 0.5 | 10.3 | 90 | B (474) | A (98) |
| | 27 | 7 | 4.4 | 11.2 | 95 | C (404) | A (95) |

TABLE 3-continued

|  |  |  |  |  |  |  |  |
|---|---|---|---|---|---|---|---|
|  | 28 | 7 | 4.7 | 10.7 | 30 | A (1743) | C (71) |
|  | 29 | 0.5 | 4.6 | 10.5 | 90 | B (472) | B (85) |
|  | 30 | 45 | 4.9 | 11.1 | 90 | B (451) | B (88) |
|  | 31 | 7 | 4.4 | 11.4 | 80 | B (592) | B (90) |
|  | 32 | 7 | 4.3 | 11.8 | 65 | A (892) | B (81) |
|  | 33 | 7 | 4.4 | 12.2 | 50 | A (1003) | C (75) |
| Comp. Ex | 1 | 3 | 4.2 | 2.2 | 90 | B (465) | D (68) |
|  | 2 | 3 | 8.1 | 10.4 | 90 | B (464) | D (62) |
|  | 3 | — | 4.5 | 10.2 | 90 | D (395) | B (82) |
|  | 4 | — | 4.4 | 10.3 | 90 | B (484) | D (68) |
|  | 5 | 3 | 3.9 | 10.7 | 90 | D (381) | B (93) |
|  | 6 | 39 | 3.7 | 11.2 | 90 | B (497) | D (59) |

3-3. Average Particle Diameter of Si Alloy Composite Powder

The average value of particle diameters analyzed for 100 particles from a cross-sectional SEM image (magnification: 5000 times) of the Si alloy composite powder was defined as the average particle diameter of the Si alloy composite powder. The results are shown in Tables 2 and 3 as Si composite powder average particle diameter (μm).

3-4. Coverage of Si Alloy Composite Powder on Surface of Graphite Particles

The cross section of the negative electrode active material layer containing the graphite powder and the Si alloy composite powder hardened by the binder was observed by using an electron microscope, the coverages of the Si alloy composite powder on 10 graphite particles were determined, and the average value thereof was taken as the coverage. The results are shown in Tables 2 and 3 as graphite coverage (%).

3-5. Charging and Discharging Test

One cycle including constant current charging and discharging at a current value of 0.2 mA was performed by using the prepared coin-type battery. A value obtained by dividing the capacity (mAh) used for releasing Li by the amount (g) of the active material is an initial discharge capacity Co (mAh/g).

Regarding the measured initial discharge capacity Co, 600 (mAh/g) or more was evaluated as "A", 450 or more and less than 600 was evaluated as "B", 400 or more and less than 450 was evaluated as "C", and less than 400 was evaluated as "D". The results are shown in Tables 2 and 3.

In the second cycle and thereafter, the charging and discharging test was performed at a ⅕C rate. Here, in the C rate, the current value for (charging and) discharging an amount of electricity Co required to (charge and) discharging the electrode in 1 hour is defined as 1C.

That is, 5C means (charging and) discharging in 12 minutes, and ⅕C means (charging and) discharging in 5 hours. Then, the cycle characteristics were evaluated by performing the charging and discharging cycle 100 times. A capacity retention rate (discharge capacity after 100 cycles/initial discharge capacity (discharge capacity at first cycle)× 100) was obtained from each of the obtained discharge capacities. Then, the case where the capacity retention rate is 95% or more was evaluated as "A", the case of 80% or more and less than 95% was evaluated as "B", the case of 70% or more and less than 80% was evaluated as "C", and the case of less than 70% was evaluated as "D". The results are shown in Tables 2 and 3.

The results in Tables 2 and 3 obtained as described above show the followings.

In Comparative Example 1, the coverage of the Si alloy composite powder on the surface of the graphite particles was lower than the lower limit (5%) in the present invention, and it is presumed that the Si alloy composite powder is unevenly distributed. In Comparative Example 1, the cycle characteristics were evaluated as D.

Comparative Example 2 is an example in which the average particle diameter of the Si alloy composite powder is more than the upper limit (5 μm) in the present invention, and the cycle characteristics were evaluated as D.

Comparative Example 3 had neither a Sn—Y compound phase (Sn—Y compound particles) nor an Al—Y compound phase (Al—Y compound particles), and the initial discharge capacity was evaluated as D.

Comparative Example 4 did not have a Si—X compound phase (Si—X compound particles) and the cycle characteristics were evaluated as D.

In Comparative Example 5, the proportion of the Si phase was lower than the lower limit (30%) in the present invention, and the initial discharge capacity was evaluated as D.

In Comparative Example 6, the proportion of the Si phase was upper than the upper limit (95%) in the present invention, and the cycle characteristics were evaluated as D.

As described above, in all Comparative Examples, the initial discharge capacity or the cycle characteristics were evaluated as D, and the battery characteristics in consideration of the initial discharge capacity and the cycle characteristics have not yet been sufficiently improved.

In contrast, in each Example in which the Si alloy composite powder has an average particle diameter of 5 μm or less, contains Si particles, Si—X compound particles, and at least one of Sn—Y compound particles and Al—Y compound particles, and has a proportion of the Si particles of 30 mass % to 95 mass % and a coverage of the Si alloy composite powder on the surface of the graphite particles of 5% or more, the battery characteristics are improved compared to the above-described Comparative Examples.

In all of Examples, there are no evaluation as D in the initial discharge capacity nor the cycle characteristics, and it can be seen that the initial discharge capacity and the cycle characteristics are improved in a well-balanced manner. In particular, in Examples 25 and 26 in which the Si alloy composite powder is refined to an average particle diameter of 1 μm or less, excellent cycle characteristics are obtained without impairing the initial discharge capacity.

Note that, in Example 27 in which the proportion of the graphite powder is increased to 95%, the initial discharge capacity is evaluated as C, but the cycle characteristics are evaluated as A, which is very high. This is particularly suitable in the case where high cycle characteristics are required.

In addition, in Example 28 in which the proportion of the graphite powder is lowered to 30%, the cycle characteristics are evaluated as C, but the initial discharge capacity is evaluated as A, which is very high. This is particularly suitable in the case where a high initial discharge capacity is required.

Although the electrode material for lithium ion battery and the lithium ion battery according to the present invention have been described in detail above, the present invention is not limited to the above-described embodiment and Examples. For example, in the above-described embodiment, Si particles, Si—X compound particles, and the like are obtained by finely pulverizing Si alloy particles having each phase. However, in some cases, it is also possible to form Si particles, Si—X compound particles, and the like directly from a molten metal and mix them to form a Si alloy composite powder. The present invention can be modified in various ways without departing from the spirit thereof.

The present application is based on Japanese patent application No. 2021-161674 filed on Sep. 30, 2021, and the contents thereof are incorporated herein as reference.

The invention claimed is:

1. An electrode material for lithium ion battery, comprising:
    a graphite powder; and
    a Si alloy composite powder, wherein
    the Si alloy composite powder has an average particle diameter of 5 µm or less and contains Si particles, Si—X compound particles, and at least one of Sn—Y compound particles and Al—Y compound particles,
    an element X constituting the Si—X compound particles is at least one element selected from the group consisting of Fe, Ni, Cr, Co, Mn, Zr, and Ti,
    an element Y constituting the Sn—Y compound particles and the Al—Y compound particles is at least one element selected from the group consisting of Cu, Fe, Ni, Cr, Co, Mn, Zr, and Ti,
    a proportion of the Si particles in the Si alloy composite powder is 30 mass % to 95 mass %, and
    a coverage of the Si alloy composite powder on a surface of graphite particles is 5% or more, and
    wherein the Si particles are particles consisting only of a Si phase, or particles in which 95 mass % or more of the particles consist of a Si phase, and
    the Si—X compound particles are particles consisting only of a Si—X compound, or particles in which 95 mass % or more of the particles consist of a Si—X compound.

2. The electrode material for lithium ion battery according to claim 1, wherein a proportion of the graphite powder in a mixed powder of the graphite powder and the Si alloy composite powder is 97 mass % to 20 mass %.

3. The electrode material for lithium ion battery according to claim 1, wherein the element X is at least one element selected from the group consisting of Fe, Ni, Cr, and Zr.

4. The electrode material for lithium ion battery according to claim 1, wherein a mass ratio represented by {Si—X compound/(total of Sn—Y compound and Al—Y compound)} is 1 to 39.

5. The electrode material for lithium ion battery according to claim 1, wherein the element Y is Cu.

6. The electrode material for lithium ion battery according to claim 1, wherein the average particle diameter of the Si alloy composite powder is 1 µm or less.

7. The electrode material for lithium ion battery according to claim 1, wherein the average particle diameter of the Si alloy composite powder is 0.7 um or less.

8. A Si alloy composite powder,
    having an average particle diameter of 5 µm or less,
    comprising: Si particles; Si—X compound particles; and at least one of Sn—Y compound particles and Al—Y compound particles, wherein
    an element X constituting the Si—X compound particles is at least one element selected from the group consisting of Fe, Ni, Cr, Co, Mn, Zr, and Ti,
    an element Y constituting the Sn—Y compound particles and the Al—Y compound particles is at least one element selected from the group consisting of Cu, Fe, Ni, Cr, Co, Mn, Zr, and Ti, and
    a proportion of the Si particles in the Si alloy composite powder is 30 mass % to 95 mass %, and
    wherein the Si particles are particles consisting only of a Si phase, or particles in which 95 mass % or more of the particles consist of a Si phase, and
    the Si—X compound particles are particles consisting only of a Si—X compound, or particles in which 95 mass % or more of the particles consist of a Si—X compound.

9. The Si alloy composite powder according to claim 8, which is used for an electrode material together with a graphite powder.

* * * * *